US005274525A

United States Patent [19]

Le Meur

[11] Patent Number: 5,274,525

[45] Date of Patent: Dec. 28, 1993

[54] DEVICE FOR THERMAL PROTECTION WITHIN A LIMITED RANGE OF TEMPERATURES, ESPECIALLY FOR AN APPARATUS FOR RECORDING BATTERY-BACKED DATA AND IN PARTICULAR A FRANKING MACHINE

[75] Inventor: Germain Le Meur, Stains, France

[73] Assignee: Secap, Boulogne-Billancourt, France

[21] Appl. No.: 955,752

[22] PCT Filed: Apr. 24, 1992

[86] PCT No.: PCT/FR92/00372

§ 371 Date: Dec. 24, 1992

§ 102(e) Date: Dec. 24, 1992

[87] PCT Pub. No.: WO92/20085

PCT Pub. Date: Nov. 12, 1992

[30] Foreign Application Priority Data

Apr. 26, 1991 [FR] France ............................... 91 05167

[51] Int. Cl.[5] ................................................ H02H 5/04

[52] U.S. Cl. ...................................... 361/105; 337/87; 337/364; 337/371

[58] Field of Search ......................... 361/103, 105, 26; 337/86, 87, 94, 95, 363, 364, 370, 371

[56] References Cited

U.S. PATENT DOCUMENTS

| | | | |
|---|---|---|---|
| 3,500,277 | 3/1970 | Nardulli | 337/343 |
| 3,878,499 | 4/1975 | Concin | 337/380 |
| 4,035,756 | 7/1977 | Schmitt | 337/370 |

FOREIGN PATENT DOCUMENTS 0165731 12/1985 European Pat. Off. .

*Primary Examiner*—Todd E. DeBoer

*Attorney, Agent, or Firm*—Jacobson, Price, Holman & Stern

[57] ABSTRACT

A data-recording machine is protected against temperature overshoots by a device (12) for protecting electrical lines comprising two blister-type thermosensitive elements (10C, 10F) which control series-connected electric contacts (7C, 7F) so as to close the electrical line outside the normal operating range and to prohibit operation even after a return to said range.

11 Claims, 3 Drawing Sheets

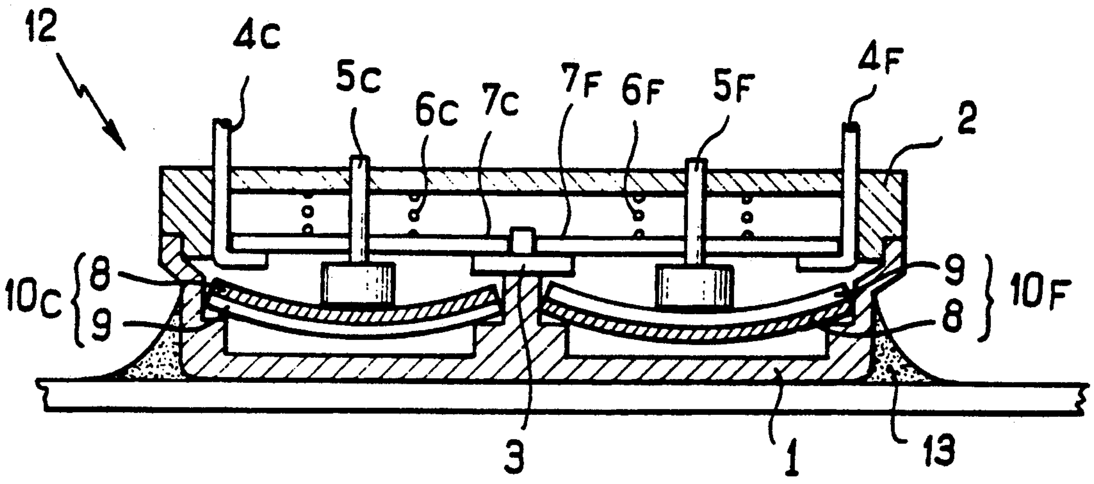
FIG_1
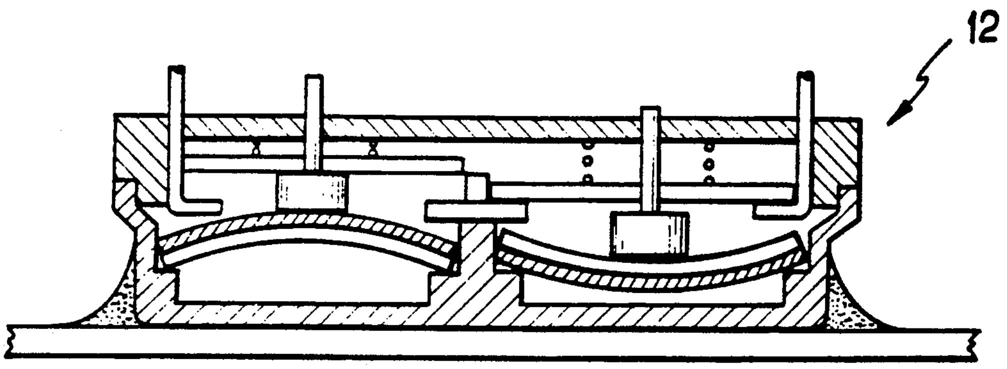
FIG_2
| | CONTACT C | CONTACT F | PROTECTER |
|---|---|---|---|
| T > TNF | 0 | 0 | 0 |
| TNC < T < TNF | 0 | 1 | 0 |
| TRC < T < TNC | 1 | 1 | 1 |
| TRC < T < TRF | 1 | 0 | 0 |
| T < TRC | 0 | 0 | 0 |
FIG_3

DEVICE FOR THERMAL PROTECTION WITHIN A LIMITED RANGE OF TEMPERATURES, ESPECIALLY FOR AN APPARATUS FOR RECORDING BATTERY-BACKED DATA AND IN PARTICULAR A FRANKING MACHINE

The present invention relates to the thermal protection of an electrical line between a high temperature and a low temperature. The invention relates in particular to franking machines which involve electronic counting. At each franking operation, the franked value is stored in a memory backed-up by a battery having a long service life (for example, 10 years in the case of a lithium cell).

Retention of data can therefore be guaranteed if the batteries are replaced every five years on condition that the memories have not been subjected to any electronic or thermal shock.

Protection against electric shocks is achieved by placing within the franking machine at least two battery-backed memories which are continuously monitored for coherence of contents, in particular the identity of price totalizing counters. As soon as an abnormal condition appears, the machine goes into an error state, thus prohibiting its subsequent use but making it possible to determine the contents of at least one of the memories, considering that simultaneous destruction of both memories by electric shock is improbable.

This does not apply in the case of thermal protection of a machine in which all the elements of the machine are subjected simultaneously to the same shock.

Recording of data may be disturbed beyond a limiting temperature whilst the other functions of the machine are still valid. In order to prevent any fraud by heating of the machine, a thermal protector has therefore been placed in series on the franking control unit in order to prohibit any subsequent franking in the event of overstepping of a safety temperature for the recording of data such as 75° C., for example.

Up to the present time, attention has been devoted only to heating which anyone can readily perform by means such as kitchen ovens.

There is employed for this purpose a manual-reset thermostat in which the heat-sensitive element is a dished bimetallic disk, the curvature of which is reversed at an operating temperature TN and which is restored to its initial curvature only by manual resetting or at a restoral temperature TR below 0° C.

By way of example, TN is equal to 77° C.±3° C. whilst TR is lower than 0° C.; the differential temperature or hysteresis equal to TN-TR is therefore higher than 77° C.

Metal disks of this type are manufactured by the Comepa Company which adapts their temperatures by combination of the metals and of their curvature.

In regard to cooling, recording incidents occur only below −40° C. and it was considered as difficult to maintain and employ a franking machine below −40° C. This consideration has now been disproved since deep-freeze units have become widely available.

It therefore proves useful to protect data-recording machines also against low-temperature conditions.

The aim of the present invention is to permit the use of an electrical line, especially on a data-recording machine, only between two limiting temperatures, namely a high temperature and a low temperature.

In accordance with the invention, the device providing thermal protection of an electrical line between a high temperature TNC and a low temperature TRF is of the type comprising a two-state bithermosensitive element which controls a contact placed on the electrical line, the thermosensitive element being intended to change from a first state to the second state by heating to a first temperature TNC and to change back by cooling from the second state to the first state at a second temperature TRC lower than the first, the first and second temperatures being intended to form a hysteresis interval TRC, TNC.

In accordance with the invention, the protector comprises a second bithermosensitive element which is identical in design to the first, the hysteresis intervals (or differential temperatures) of the two elements being intended to include the high temperature TNC and the low temperature TRF, the first element being preconditioned so as to change state at the temperature TNC whilst the second is preconditioned so as to change state at the low temperature TRF, preconditioning being also such that, and the electric contacts associated with the two thermosensitive elements being mounted so as to ensure that the electrical line is in a first electrical state when the temperature of the protector remains between the high temperature TRC and the low temperature TRF whilst at least one of the contacts changes state and changes the electrical state of the line when one of the temperatures TNC or TRF is overstepped, and that at least one of the contacts remains in the new state as well as the electrical line when the temperature is brought back between the high temperature TRC and the low temperature TRF.

In U.S. Pat. No. 4,035,756, it is known to mount bimetallic blistering disks in series but these latter are of different construction and assembled in a complicated manner. The question of cooling is not dealt with. In patent No. EP-A-165,731, there is shown only one blistering disk completed by a complicated mechanism for preventing it from being reset in the cold state.

The contacts of the device in accordance with the invention can be mounted either in parallel on the electrical line which is tested for opening or closing, or in series. Especially in the case last mentioned, they are mounted in such a manner that the contacts are normally closed on the electrical line when the temperature of the protector remains between the high temperature TNC and the low temperature TRF whilst at least one of the contacts is open when one of the temperatures TNC or TRF is overstepped, and that at least one of the contacts remains open when the temperature is brought back between the high temperature TNC and the low temperature TRF.

Advantageously, the sensitive elements are bimetallic disks which are incurved in the state of rest with reverse curvatures with respect to the metallic face which expands to the greatest extent.

The sensitive elements and their contacts are placed within two different casings or within a single casing.

Preferably, the bimetallic disks are incurved in substantially adjacent relation in the same sheet and joined together by a tongue formed of the sheet material.

Advantageously, provision is made for one push-rod per sensitive element in order to permit mechanical return of the sensitive element associated therewith to its preconditioned state.

The device of the invention is integrated with a data-recording machine equipped with a battery-backed memory.

The device is for example placed on the writing line of the memories and/or on the control line of a printing device with which the machine is equipped.

Advantageously, the data-recording machine is under seals so as to ensure that manual resetting by the user is impossible.

The device can be employed in several ways. It can be connected to the recording system so as to prohibit its operation from the moment when the machine has been brought to a temperature located outside the specified range, or else it is connected to the recording system so as to produce an error message when the machine has been brought to a temperature located outside the specified range.

A better understanding of the invention will be gained from a perusal of the non-limitative example which is given as an application to the thermal protection of a franking machine and with reference to the accompanying figures, in which:

FIG. 1 is a sectional view of a thermal protector in accordance with the invention and in the state of rest.

FIG. 2 is the same sectional view of the thermal protector in which one of the contacts is activated.

FIG. 3 is a truth table of the state of the contacts of the thermal protector in accordance with FIG. 1.

at room temperature after overstepping of the high temperature after overstepping of the low temperature.

Figure 4:
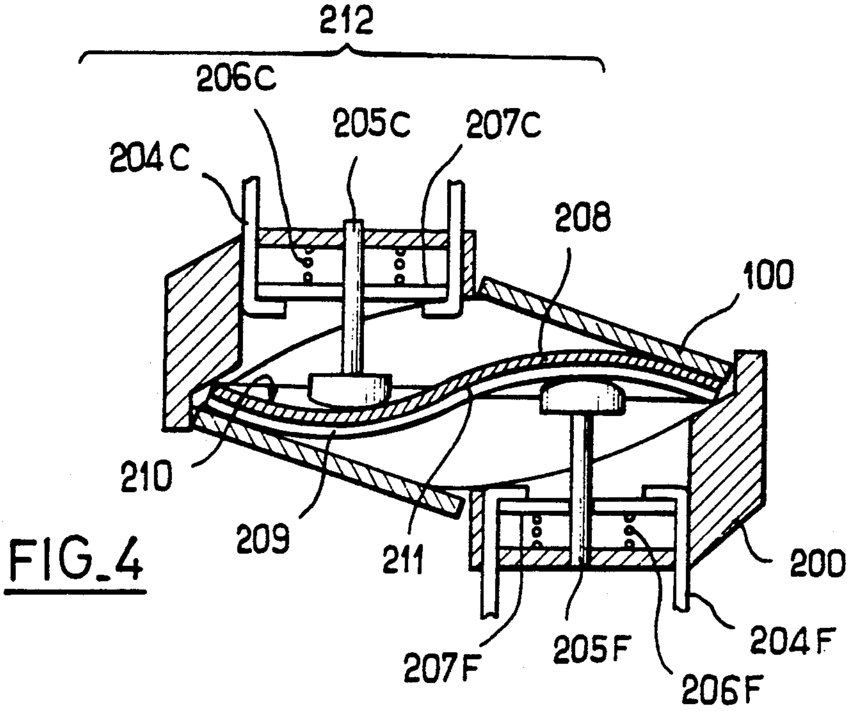
FIG. 4 is a sectional view of an alternative embodiment of a thermal protector in accordance with the invention.
Figure 5:
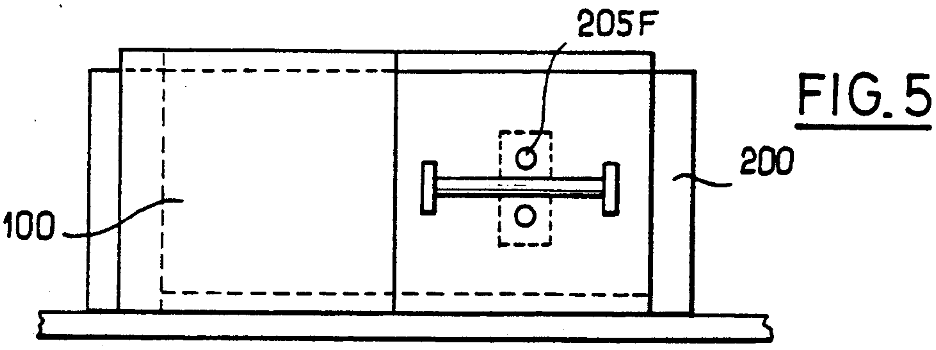
FIG. 5 is a top view of the device of FIG. 4.
Figure 8:
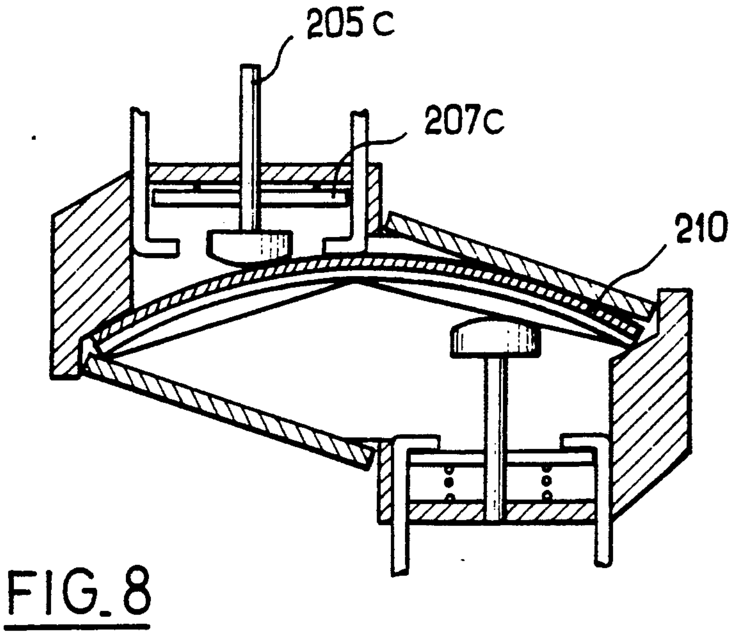

FIG. 8 is a sectional view of the device of FIG. 4 in the position assumed after overstepping of the high temperature.

Figure 9:
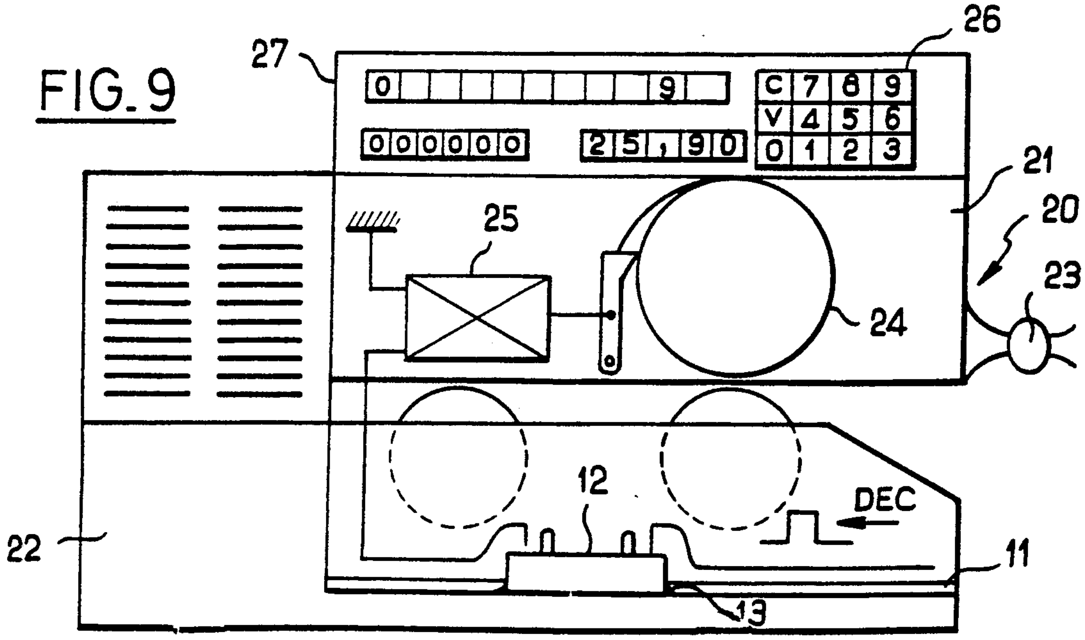
Figure 6:
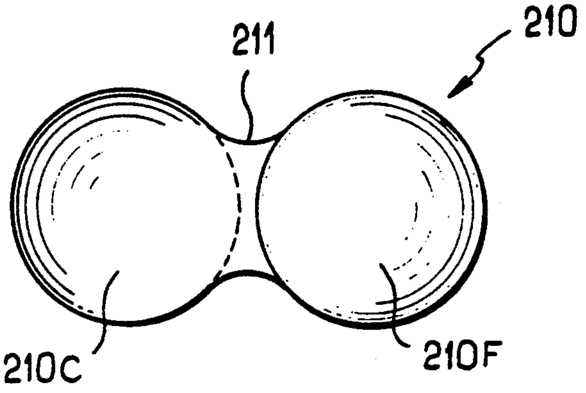
FIG. 6 shows in greater detail the temperature-sensitive element employed in the protector of FIG. 4, in its initial position and at room temperature.

FIG. 9 is the general view of a franking machine equipped with a thermal protector in accordance with the invention.

The protector 12 of FIG. 1 includes a metal casing 1 of good thermal conductivity closed by a cover 2 of insulating material having high resistance to extreme temperatures. Within the casing 1 are placed two bimetallic blistering disks 10C and 10F which are distinguished by their initial shape but not by their components, namely: a disk 8 having a high coefficient of expansion and a disk 9 having a low coefficient of expansion. The disk 8 and the disk 9 are die-stamped one on top of the other so as to form a spherical cap. In the same orthonormal system, the bimetallic disk 10 can assume in known manner two reversed radii of curvature, depending on the prestress to which it has been subjected.

Accordingly, the disk 10C which is intended to reverse its curvature in the hot state is concave on the side corresponding to the disk 8 which has a high coefficient whilst the disk 10F is initially concave on the side corresponding to the disk 9 which has a low coefficient. The disks 10F and 10C change state respectively at a higher operating temperature TNF and TNC whilst they revert to their state at a recovery temperature TRF and TRC.

At the center of each disk 10, there rests respectively a push-rod 5C, 5F, the head of which cooperates with a contact 7C, 7F which is resiliently restored by a spring 6C, 6F. The tail of each push-rod 5C, 5F is guided within a hole of the cover 2 and can project with respect to said cover in one of the two states of the disk 10. Lead-out connections from the contacts are provided by the pins 4C, 4F whilst a metal connecting-piece 3 connects the two contacts in the closed position.

FIG. 2 illustrates the same thermal protector 12 constituted by the elements mentioned above, with this difference that the disk 10C has reversed its curvature under the action of a rise in temperature above its limit TNC whilst the disk 10F has retained its initial curvature under the same temperature rise.

If the thermal protector 12 of FIG. 1 had been subjected only to cooling to a temperature below TRF, the disk which would have reversed its curvature would have been the disk 10F whilst the disk 10C would have retained its initial curvature under the same cooling action.

FIG. 3 shows the state of the contacts F and C as a function of the temperatures and it can be seen that the thermal protector is conductive between TRC and TNF and that it is open outside these limits.

FIG. 1 shows the combination of the two disks 10C and 10F within a single casing 1. It is apparent that it would not constitute a departure from the scope of the invention to place the disks 10C and 10F within two casings, each casing being intended to be located as close as possible to the machine components which are sensitive to cold or to heat, and to connect their contacts in series.

It would also be within the scope of the invention to join the two disks 10C and 10F to each other by means of a bimetallic tongue in the same manner as the two disks.

FIGS. 4 to 8 describe this arrangement. In FIG. 4, there can be seen a thermal protector 212 constituted by an insulating casing 200 and by a heat-conducting cover 100. Within the casing 200 is placed an element 210 which is bisensitive to extreme temperatures. The element is constituted by two sheets 208 and 209 which have at room temperature two adjacent reversed spherical caps joined together by means of a flat tongue 211 (see FIG. 6 which shows on the left a concave portion 210C and on the right a convex portion 210F joined together by the tongue 211).

Figure 7:
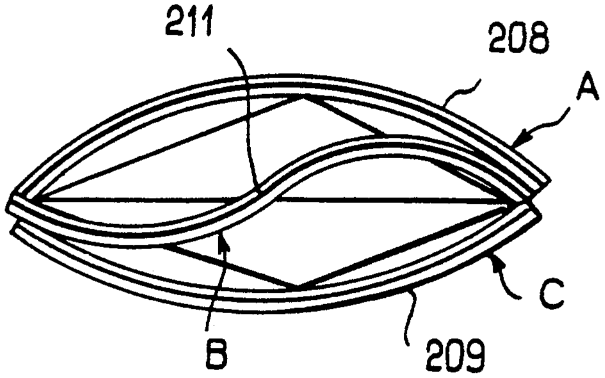
FIG. 7 shows the element of FIG. 6, as seen in cross-section in its three positions.

This element can assume four different stable shapes, three of which are shown in FIG. 7, given the fact that the sheet 208 has a higher coefficient of expansion than the sheet 209: position A corresponds to overstepping of the high temperature, B is the position at room temperature and C corresponds to overstepping of the low temperature.

Two push-rods 205C, 205F rest on the element 210 and each cooperate with a contact 207C, 207F, the respective lead-out connections of which are provided by a pair of pins 204C, 204F.

FIG. 9 illustrates a franking machine 20 constituted by a printing head 21 and a base 22. The printing head to which seals 23 are affixed includes a printing drum 24 controlled by an electromagnet 25 which is linked electrically with the actuating signal DEC produced by the passing of the letters, through the intermediary of the thermal protector 12 which is bonded to the base 11 by means of a conductive adhesive 13. A keyboard 26 and a readout 27 serve to set up the value to be franked and to control the counter for totalizing francs and partial totals of francs and of envelopes.

The franking machine is protected against temperature excesses as follows: when the machine is fraudulently subjected to a temperature higher than TNC such as 75° C., the disk 10 C reverses its curvature and lifts the push-rod 5C, thus opening the contact 7C as shown in FIG. 2. No signal DEC can any longer be transmitted to the electromagnet, thus prohibiting any subsequent franking and therefore any modification of the totalizing counter, the memories and batteries of which afford resistance to a temperature higher than 75° C.

Furthermore, if the machine is subjected to cooling to a temperature below TRF such as −30° C., the disk 10F reverses its curvature so as to open the contact 7F, which has the same effect as above on the franking operation.

If, after an excessive temperature rise, it is endeavored to restore the franking operation by excessive cooling, the disk 10C will in fact return to its initial position at TRC such as −35° C. but the disk 10F will previously have reversed its curvature at TRF such as −30° C. in order to open the contact 7F.

Conversely, if it is endeavored after excessive cooling to restore the franking operation by means of excessive heating, the contact 10F will in fact re-close at TNF such as 80° C. but the contact 7C will previously have opened at TNC such as 75° C.

In regard to the protector 212 of FIGS. 4 to 8, the thermal behavior is similar to that described in the foregoing except for the fact that, if they are preformed to the same radius of curvature, the two spherical caps are caused to combine their respective deformations under the influence of the tongue 211 which joins them together.

In FIG. 4, the protector 212 is shown in the state of rest at room temperature. If the machine is subjected to a temperature rise, the sheet 208 increases in length to a greater extent than the sheet 209, thus tending to decrease the curvature of the left-hand cap and to increase the curvature of the right-hand cap.

At the limiting temperature TNC such as 75° C., the element 210 abruptly takes up the position shown in FIG. 8 so as to open the contact 207C.

The contrary takes place if the machine is cooled. The sheet 209 contracts to a lesser extent than the sheet 208, thus tending to reduce the right-hand curvature and to increase the left-hand curvature, with the result that the element 210 is abruptly caused to take up the position which is symmetrical with that shown in FIG. 8 when the low temperature reaches the value TRF such as −30° C.

If, after excessive heating, it is endeavored to reset the protector 212 by excessive cooling, the two upwardly curved caps will be caused to curve simultaneously in the downward direction and change abruptly to the temperature TRF such as −30° C. under the influence of the tongue 211.

Conversely, if it is endeavored after excessive cooling to reset the protector 212 by excessive heating, the downwardly curved caps flip simultaneously upwards at the temperature TNC such as 75° C.

It is therefore observed that the reactions of the bimetallic disks to extreme temperatures have a complementary character such that the protector is in a state P between extreme temperatures whereas it is in the complementary state P outside said temperatures.

Re-starting of the machine is possible only after the seals have been broken and after the contact which has been reversed by the excessive temperature has been reset by pressing on the projecting push-rod associated therewith, depending on whether excessive heating or excessive cooling has taken place.

Any machine which has been subjected to a temperature excess is therefore unserviceable. Moreover, when the machine is opened after breaking the seals, the nature of the temperature excess can be determined by means of one of the projecting push-rods.

If an inspection finally points to an incident which is not likely to be repeated, it is a very easy matter to restore operation by depressing the projecting push-rod.

In another embodiment in accordance with the invention, the thermal protector 12 is connected electrically to the electronic system which controls all the functions of the machine. At the time of turn-on of the machine and at regular intervals during operation of this latter, the electronic system tests the state of the contacts of 12 and, in the event of a fault condition arising from transient overstepping of specified temperature limits, the machine puts itself in a state in which it no longer responds to the user's orders and displays an error message.

Steps are also taken to ensure that the machine as a whole including the thermal protector is protected by means of seals against any attempt to intervene in order to reset the protector 12. Thus a careless or dishonest user cannot restore the situation and the machine is made irremediably unserviceable for the user.

I claim:

1. Device providing thermal protection of an electrical line between a high temperature TNC and a low temperature TRF, of the type comprising a two-state thermosensitive element (10C; 210C) which controls a contact (7C; 207C) placed on the electrical line, the thermosensitive element (10C; 210C) being intended to change from a first state to the second state by heating to a first temperature TNC and to change back by cooling from the second state to the first state at a second temperature TRC lower than the first, the first and second temperatures being intended to form a hysteresis interval TRC, TNC, characterized in that it comprises a second thermosensitive element (10F; 210F) which is identical in design to the first, the hysteresis intervals of the two elements (10C, 10F; 210C, 210F) being intended to include the high temperature TNC and the low temperature TRF, the first element (10C; 210C) being preconditioned so as to change state at the temperature TNC whilst the second (10F; 210F) is preconditioned so as to change state at the low temperature TRF, preconditioning being also such that, and the electric contacts (7C, 7F; 207C, 207F) associated with the two thermosensitive elements being mounted so as to ensure that the electrical line is in a first electrical state when the temperature of the protector remains between the high temperature TNC and the low temperature TRF whilst at least one of the contacts changes state and changes the electrical state of the line when one of the temperatures TNC or TRF is overstepped, and that at least one of the contacts remains in this new state as well as the electrical line when the temperature is brought back between the high temperature TNC and low temperature TRF.

2. Device according to claim 1, characterized in that the sensitive elements (10, 210) are bimetallic disks which are incurved in the state of rest with reverse curvatures with respect to the metallic face which expands to the greatest extent.

3. Device according to claim 1, wherein the sensitive elements and their contacts are placed within two different casings.

4. Device according to claim 1, wherein the sensitive elements are placed within a single casing (2).

5. Device according to claim 1, characterized in that provision is made for one push-rod (5, 205) per sensitive element (10, 210) in order to permit mechanical return of the sensitive element associated therewith to its preconditioned state.

6. Device according to claim 1, characterized in that the contacts are mounted in series in such a manner that the contacts are normally closed on the electrical line when the temperature of the protector remains between the high temperature TNC and the low temperature TRF whilst at least one of the contacts is open when one of the temperatures TNC or TRF is overstepped, and that at least one of the contacts remains open when the temperature is brought back between the high temperature TNC and low temperature TRF.

7. Device according to claim 2, wherein the bimetallic disks are incurved in substantially adjacent relation in the same sheet and joined together by a tongue (211), the tongue material being constituted by the sheet.

8. Device according to claim 1, characterized in that it is integrated with a data-recording machine (20) equipped with a battery-backed memory.

9. Device according to claim 8, characterized in that the data-recording machine is under seals (23) so as to ensure that manual resetting by the user is impossible.

10. Device according to claim 8, characterized in that it is connected to the recording system so as to prohibit its operation from the moment when the machine has been brought to a temperature located outside the specified range.

11. Device according to claim 8, characterized in that it is connected to the recording system so as to produce an error message when the machine has been brought to a temperature located outside the specified range.

* * * * *